Patented June 8, 1926.

1,588,164

UNITED STATES PATENT OFFICE.

JOSEF BRUNNER, OF VIENNA, AND ERICH SCHEELE, OF BRUNN AM GEBIRGE, AUSTRIA.

PROCESS OF PRESERVING ARTICLES.

No Drawing. Application filed February 28, 1925, Serial No. 12,325, and in Austria November 14, 1923.

The production of physiological preparations by means of methylated spirit has considerable disadvantages. The stability of the preparations is slight. The unwieldiness and danger of breakage of the glass vessels, the poor adaptability for transport, the liability to catch fire and the volatility of the methylated spirit are further important disadvantages of this method of preservation. Many of these disadvantages also appertain to preparations preserved with formaldehyde. The drying up of insects held on needles also is a defective method of preserving, for the insect bodies in time become brittle, can be damaged by a slight touch and collapse after a short time. Endeavours to embed animal and vegetable bodies in transparent solid bodies have not led to any satisfactory result. The soaking of the animal bodies with resin and paraffin does not produce permanent preparations, the containing case is also combustible and not capable of withstanding shocks and blows. The embedding in celluloid colloxylin, resin, and the like produces combustible preparations which shrink by reason of the evaporation of the solvents, and are not sufficiently solid.

The present invention relates to the production of manipulable preparations of great durability, which are also transportable and resistant and non-combustible.

The condensation products of formaldehyde and carbolic acid and of formaldehyde and urea have been found, as shown by experiments, to be particularly suitable as embedding masses for animal and vegetable bodies. Animal bodies soaked in these condensation products are of great durability due to the strongly disinfecting action of the formaldehyde and of the carbolic acid, which initial components of the condensation products are always contained therein in small quantities in an unchanged condition. The use of these condensation products capable of being hardened by heating also has the advantage that preparations of very great firmness are obtained.

All artificial resins are suitable which for example are prepared from phenol and phenol derivatives on the one hand and aldehydes on the other hand, further from methyl chlorides and phenol, from sulphur and phenol, from aromatic amines and sulphur, from urea and its derivatives and aldehydes, from furfurol and acetone, from aldehydes and aromatic amines.

Not only insects and plants, but also amphibia, reptiles, fishes, crustacea and so forth may be preserved with artificial resins. The preparations thus produced are very resistant to shock and are applicable to the production of ornamental and decorative articles.

In certain animal groups for example reptiles it is advisable to remove the water from the animals by placing them in alcohol. In such a case the addition of formaldehyde is advantageous.

Explanatory examples.

*1st Example.* An insect, for example, a beetle, has a needle passed therethrough and is dried for some days. The needle, which carries the insect, is then pressed into the bottom of a mould of wood or paste board and a thin flowing condensation product of formaldehyde and carbolic acid or of urea and formaldehyde is poured into the mould until the insect body is covered.

If after pouring in the resin air-bubbles remain on the insect these can be removed by the use of a vacuum before the resin hardens. In this manner the air is also withdrawn from the interior of the body and the resin mass penetrates into it. The liquid condensation product enclosing the insect body is converted into the solid and insoluble condition by heating. The insect is obtained in a transparent very hard mass which can be ground and polished. If it is not desired to also embed the needle the insect may first be secured to a thin layer of resin and then become completely enclosed by the further addition of resin.

*2nd Example.* The body of a salamander is stored for some days in alcohol, to which is preferably added a small percentage of formaldehyde, for removing water; it is then dried in air and, as stated above, embedded in artificial resin and the latter is hardened.

*3rd Example.* A vegetable part for example, a blossom, is dried and treated according to the process described.

What we claim and desire to secure by Letters Patent is:—

1. A process of preserving physiological specimens, which consists in embedding the specimens in an artificial aldehyde resin.

2. A permanently preserved physiological specimen, comprising the said specimen and a surrounding mass of a transparent hardened artificial aldehyde resin.

3. A process of preserving articles, particularly physiological specimens, consisting in embedding the article in a resinous condensation product of a phenol and an aldehyde.

4. A process of preserving articles, particularly physiological specimens, consisting in embedding the article in a condensation product of carbolic acid and an aldehyde, and heating the same to solidification.

5. A process of preserving articles, particularly physiological specimens, consisting in embedding the article in the condensation product of carbolic acid and formaldehyde, and heating the same to solidification.

6. A permanently preserved article such as an insect or botanical specimen, comprising the said article and a surrounding mass of a hardened condensation product of a phenol and an aldehyde.

In testimony thereof we have affixed our signatures.

JOSEF BRUNNER.
Dr. ERICH SCHEELE.